United States Patent Office 2,931,823
Patented Apr. 5, 1960

2,931,823

PROCESS FOR PREPARATION OF TRIS-(PENTA-CHLOROPHENYL) PHOSPHATE

Arnold E. Jeltsch, Pittsburgh, Pa., assignor to Koppers Company, Inc., a corporation of Delaware No Drawing. Application June 23, 1954
Serial No. 438,858

2 Claims. (Cl. 260—461)

This application is concerned with a new and improved method for the preparation of tris-(pentachlorophenyl) phosphate.

Heretofore, the preparation of various phenyl phosphates has been accomplished by the catalytic reaction of phosphorus oxychloride and a phenol. Catalysts such as ferric chloride have been found suitable for this reaction. However, the use of this catalyst is disadvantageous in the preparation of tris-(pentachlorophenyl) phosphate for certain uses in that the presence of iron is objectionable in the product. Although the iron content can be reduced by washing with hydrochloric acid this process is both laborious and expensive and additionally removal of the last traces of iron is particularly difficult.

It has been discovered as a feature of this invention that it is possible to prepare tris-(pentachlorophenyl) phosphate by the uncatalyzed reaction of 3 moles of pentachlorophenol with 1 mole phosphorus oxychloride in an inert high-boiling organic solvent, such as, for example a eutectic mixture of phenyl ether and biphenyl, at a temperature in the range of 210–250° C. The preparation is accomplished by preparing a mixture of pentachlorophenol and the solvent, adding thereto the phosphorus oxychloride over a short period of time and thereafter heating the mixture to the desired temperature as rapidly as possible without the loss of phosphorus oxychloride. At approximately 220° C. evolution of hydrogen chloride is observed. The reaction mixture is heated until the evolution of hydrogen chloride ceases, the amount of hydrogen chloride evolved being directly proportional to the amount of phosphorus oxychloride reacted.

It will be observed that the foregoing procedure does not utilize a catalyst and that therefore the product is not contaminated with the previously known and used ferric chloride catalyst.

The invention is illustrated by, but not restricted to, the following preferred embodiment.

As used herein the term "parts" means parts by weight unless otherwise specified.

*Example 1*

Two hundred sixty-six parts pentachlorophenol is dissolved at 100° C. in 500 parts of a eutectic mixture of phenyl ether and biphenyl. There is added over a period of approximately five minutes 52 parts phosphorus oxychloride. Thereafter the mixture is heated to 220–250° C. and maintained at that temperature until there is evolved 12 parts hydrogen chloride which is collected by absorption in pyridine.

Thereafter the mixture is cooled and there separates crude tris-(pentachlorophenyl) phosphate which is removed by filtration. The crude product which is contaminated with the absorbed phenyl ether-biphenyl is freed therefrom by washing with petroleum ether and drying at 100° C. The product is characterized by its melting point 225–230° C. and by analyses for chlorine and phosphorus:

|  | Observed, percent | Calculated, percent |
|---|---|---|
| Chlorine | 62.6 | 63.1 |
| Phosphorus | 3.83 | 3.68 |

What is claimed is:

1. In a process for the preparation of tris-(pentachlorophenyl) phosphate the steps comprising contacting at a temperature of about 220° C. to 250° C. pentachlorophenol and phosphorus oxychloride in the ratio of at least 3 moles pentachlorophenol to 1 mole phosphorus oxychloride in the absence of a catalyst and in the presence of an inert organic solvent for said reactants, said solvent being a eutectic mixture of phenyl ether and biphenyl and boiling at a temperature in excess of 250° C., until evolution of hydrogen chloride ceases and thereafter separating the desired product from the reaction mixture.

2. A process for the preparation of tris-(pentachlorophenyl) phosphate consisting of dissolving pentachlorophenol in a eutectic mixture of phenyl ether and biphenyl, adding thereto 1 mole of phosphorus oxychloride for each 3 moles of pentachlorophenol, rapidly heating the mixture to a temperature in the range 210°–250° C. without the loss of phosphorus oxychloride, whereupon hydrogen chloride is evolved, maintaining the reaction mixture at said temperature range until evolution of hydrogen chloride ceases, and thereafter separating the tris-(pentachlorophenyl) phosphate.

References Cited in the file of this patent

UNITED STATES PATENTS

| 2,450,903 | Mikeska | Oct. 12, 1948 |
| 2,542,604 | Weisel et al. | Feb. 20, 1951 |
| 2,727,058 | Conly | Dec. 13, 1955 |